(12) United States Patent
Maeda et al.

(10) Patent No.: US 12,103,394 B2
(45) Date of Patent: Oct. 1, 2024

(54) VEHICLE DISPLAY DEVICE

(71) Applicant: TOYOTA JIDOSHA KABUSHIKI KAISHA, Aichi-ken (JP)

(72) Inventors: Kazuhisa Maeda, Toyota (JP); Tatsuya Shimizu, Okazaki (JP); Takanobu Tabata, Toyota (JP); Yasuyuki Andou, Toyota (JP); Takahiro Suzuki, Toyota (JP); Fumihiro Onogi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 78 days.

(21) Appl. No.: 18/089,564

(22) Filed: Dec. 28, 2022

(65) Prior Publication Data

US 2023/0249551 A1 Aug. 10, 2023

(30) Foreign Application Priority Data

Feb. 4, 2022 (JP) ................. 2022-016751

(51) Int. Cl.
*B60K 35/00* (2024.01)
*B60K 35/22* (2024.01)
*B60K 35/60* (2024.01)

(52) U.S. Cl.
CPC ............ *B60K 35/00* (2013.01); *B60K 35/223* (2024.01); *B60K 35/60* (2024.01); *B60K 2360/691* (2024.01); *B60K 2360/771* (2024.01)

(58) Field of Classification Search
CPC ........ B60K 2360/691; B60K 2360/771; B60K 2360/96; B60K 35/00; B60K 35/223; B60K 35/60
See application file for complete search history.

(56) References Cited

U.S. PATENT DOCUMENTS

| 9,855,918 B1 | 1/2018 | Melaragni et al. |
| 2005/0046800 A1* | 3/2005 | Hamada ................. G03B 21/26 353/15 |
| 2010/0165219 A1* | 7/2010 | Ikunami ................ G06F 1/1656 348/836 |

(Continued)

FOREIGN PATENT DOCUMENTS

| CN | 112428933 A | 3/2021 |
| DE | 4128663 C2 | 10/2002 |

(Continued)

OTHER PUBLICATIONS

Office Action in U.S. Appl. No. 17/709,410, mailed Feb. 1, 2024, 34p.

(Continued)

*Primary Examiner* — Md N Haque
(74) *Attorney, Agent, or Firm* — HAUPTMAN HAM, LLP

(57) ABSTRACT

A vehicle display device includes: a display unit in a shape of a rectangular film, the display unit being configured to be advanced from and withdrawn into a ceiling of a vehicle cabin; a lower edge reinforcing portion located at a lower edge of the display unit, the lower edge reinforcing portion reinforcing the lower edge of the display unit; and a support mechanism configured to be extended and retracted according to an amount by which the display unit protrudes beyond the ceiling, and configured to support the display unit.

9 Claims, 10 Drawing Sheets

(56) References Cited

U.S. PATENT DOCUMENTS

| | | |
|---|---|---|
| 2014/0129092 A1 | 5/2014 | Mori et al. |
| 2017/0217290 A1 | 8/2017 | Yoshizumi et al. |
| 2017/0313192 A1 | 11/2017 | Segawa et al. |
| 2018/0286358 A1 | 10/2018 | Wunderlich |
| 2019/0041652 A1 | 2/2019 | Murayama et al. |
| 2019/0061782 A1 | 2/2019 | Cheaz et al. |
| 2020/0055378 A1* | 2/2020 | Yoshizumi ............. H04N 7/183 |
| 2020/0062176 A1* | 2/2020 | Ishibashi ................ F21V 5/004 |
| 2020/0062192 A1* | 2/2020 | Ishibashi ................ B60K 35/60 |
| 2021/0016663 A1 | 1/2021 | Ha et al. |
| 2021/0129635 A1 | 5/2021 | Park et al. |
| 2021/0206266 A1 | 7/2021 | Shim et al. |
| 2021/0212223 A1 | 7/2021 | Song et al. |
| 2021/0213830 A1 | 7/2021 | Son et al. |
| 2021/0213831 A1 | 7/2021 | Kang et al. |
| 2021/0216183 A1 | 7/2021 | Kang et al. |
| 2022/0058996 A1 | 2/2022 | Yoshizumi et al. |
| 2022/0281287 A1 | 9/2022 | Shariatzadeh et al. |
| 2022/0314799 A1 | 10/2022 | Maeda et al. |
| 2023/0131157 A1 | 4/2023 | Onogi et al. |
| 2023/0228588 A1 | 7/2023 | Lee et al. |
| 2023/0249621 A1 | 8/2023 | Maeda et al. |
| 2023/0391193 A1 | 12/2023 | Huang et al. |

FOREIGN PATENT DOCUMENTS

| | | | |
|---|---|---|---|
| DE | 10226406 C1 * | 12/2003 | ............ B60J 7/0015 |
| JP | 2016-155540 A | 9/2016 | |
| JP | 2020194179 A | 12/2020 | |
| JP | 2022-158818 A | 10/2022 | |

OTHER PUBLICATIONS

U.S. Appl. No. 17/709,410, filed Mar. 31, 2022, 46pp.
U.S. Appl. No. 18/163,879, filed Feb. 3, 2023, 44pp.
U.S. Appl. No. 18/069,891, filed Dec. 21, 2022, 96pp.

* cited by examiner

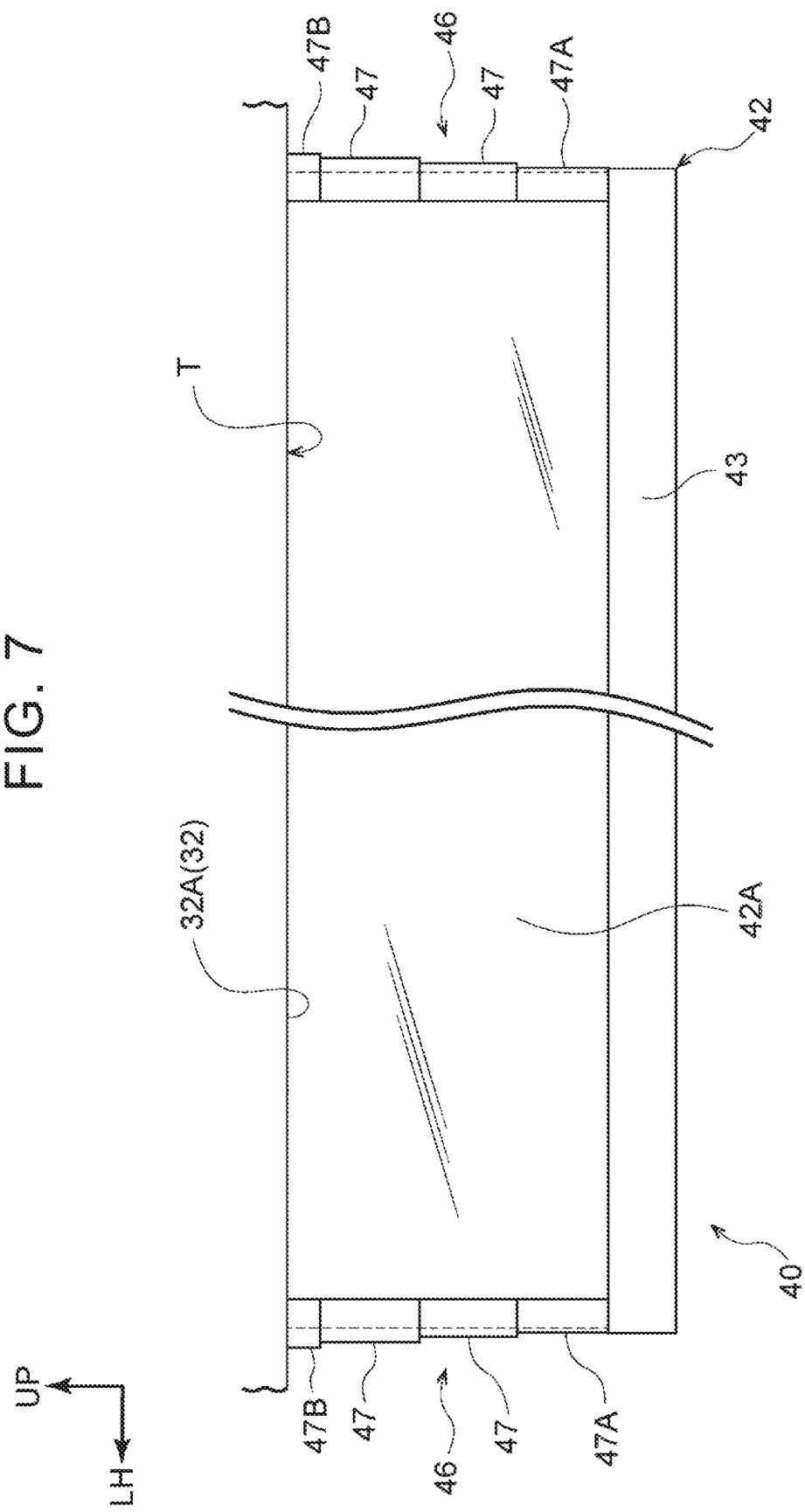

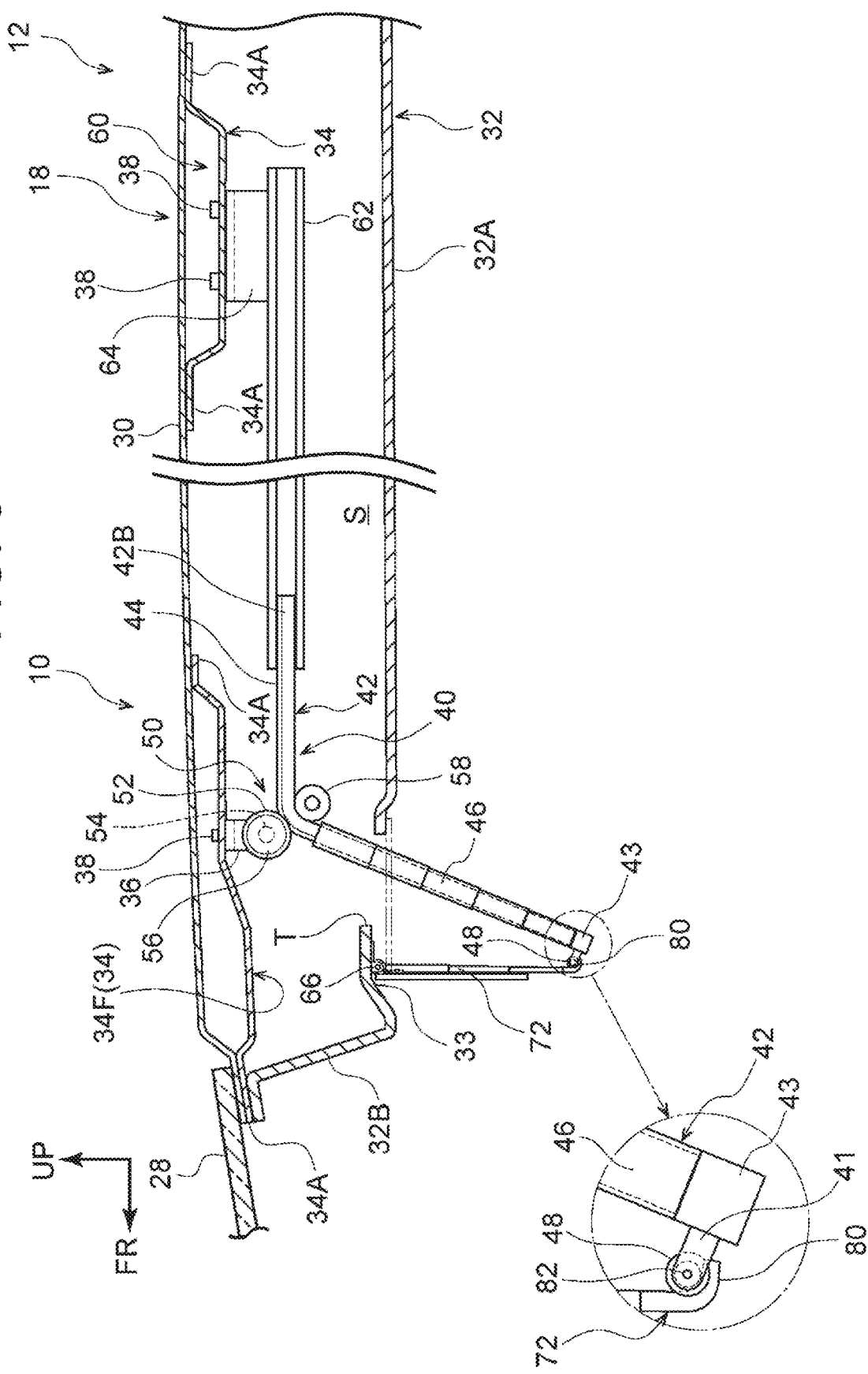

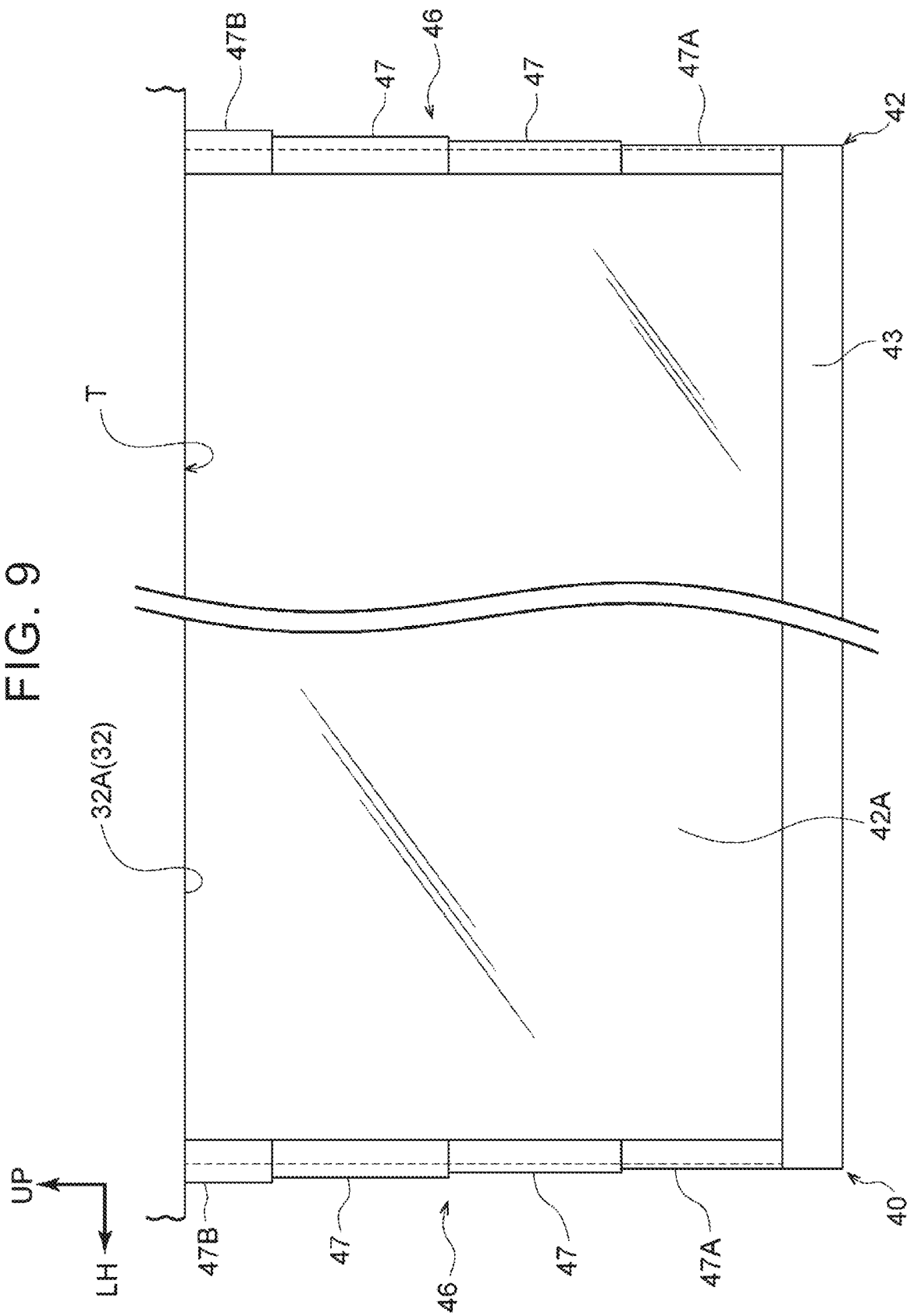

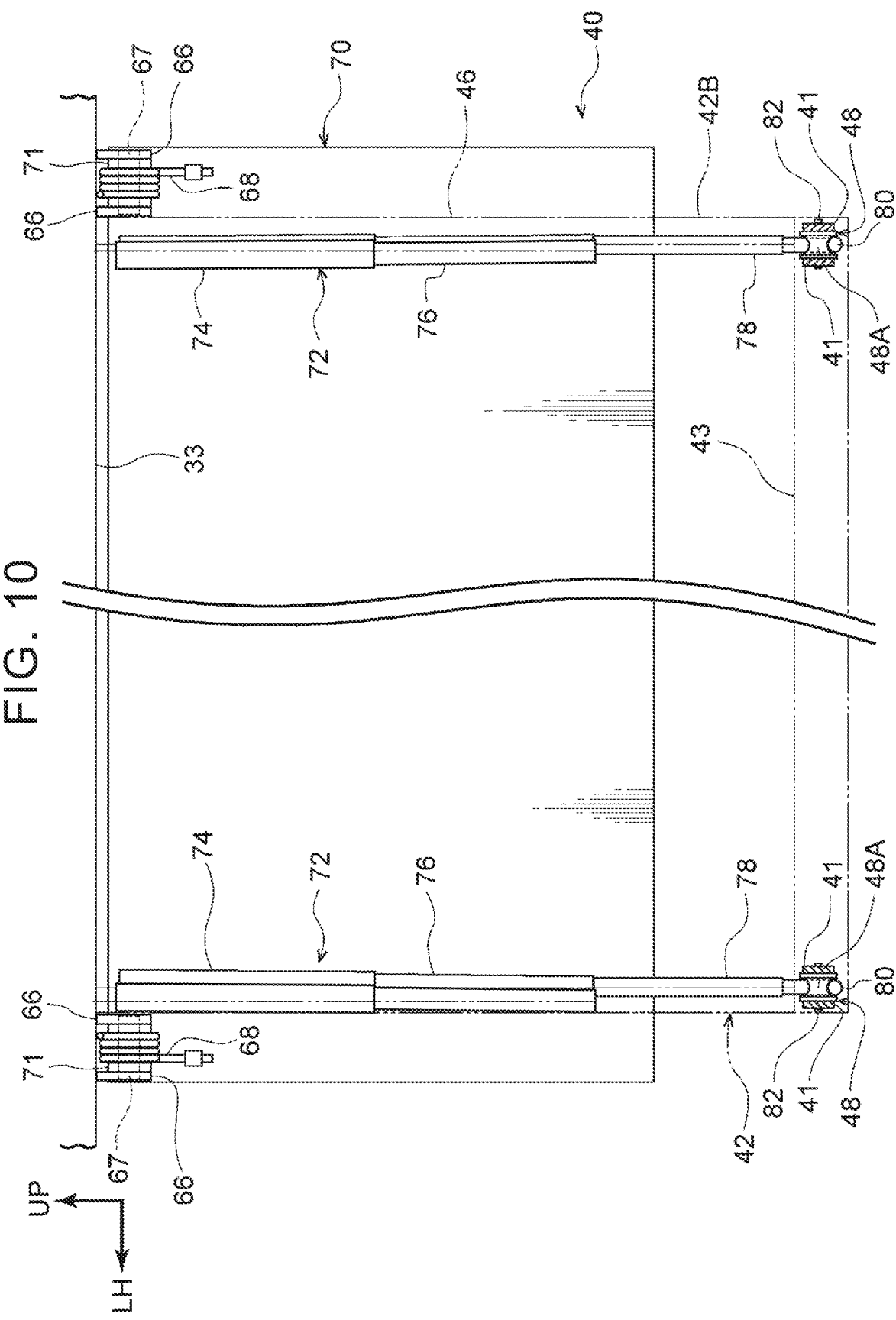

VEHICLE DISPLAY DEVICE

CROSS-REFERENCE TO RELATED APPLICATION

This application claims priority to Japanese Patent Application No. 2022-016751 filed on Feb. 4, 2022, incorporated herein by reference in its entirety.

BACKGROUND

1. Technical Field

The present disclosure relates to vehicle display devices.

2. Description of Related Art

A driver assistance system in which a monitor (display device) in the form of a film configured to be advanced into and withdrawn from a vehicle cabin is mounted on the ceiling of the vehicle cabin is conventionally known in the art (see, for example, Japanese Unexamined Patent Application Publication No. 2020-194179 (JP 2020-194179 A)).

SUMMARY

However, when a monitor (display device) is in the form of a flexible film, the monitor has very low rigidity. It is therefore difficult for an occupant to see the image displayed on the monitor due to vibration of the vehicle that occurs while the vehicle is traveling.

The present disclosure provides a vehicle display device that has sufficient rigidity even when the display device is in the form of a flexible film.

A vehicle display device according to a first aspect of the present disclosure includes: a display unit in a shape of a rectangular film, the display unit being configured to be advanced from and withdrawn into a ceiling of a vehicle cabin; a lower edge reinforcing portion located at a lower edge of the display unit, the lower edge reinforcing portion reinforcing the lower edge of the display unit; and a support mechanism configured to be extended and retracted according to an amount by which the display unit protrudes beyond the ceiling, and configured to support the display unit.

According to the vehicle display device of the first aspect of the present disclosure, the display unit that is in the shape of a rectangular film and that is configured to be advanced from and withdrawn into the ceiling of the vehicle cabin is reinforced by the lower edge reinforcing portion located at the lower edge of the display unit. The display unit is also supported by the support mechanism configured to be extended and retracted according to the amount by which the display unit protrudes beyond the ceiling. The display unit thus has sufficient rigidity even when the display unit is in the form of a flexible film.

The vehicle display device according to the first aspect of the present disclosure may further include a cover configured to be located on the ceiling, the cover being configured to open and close as the display unit is advanced and withdrawn. A longitudinal direction of the cover may be in a lateral direction of a vehicle. The support mechanism may include a pair of support arms that includes a first support arm and a second support arm. The first support arm may be provided on a first end of the cover in the longitudinal direction of the cover and may be configured to support the lower edge reinforcing portion. The second support arm may be provided on a second end of the cover in the longitudinal direction of the cover and may be configured to support the lower edge reinforcing portion.

According to the vehicle display device of the first aspect of the present disclosure, the support mechanism may include the first support arm and the second support arm. The first support arm may be provided on the first end of the cover in the longitudinal direction of the cover and the second support arm may be provided on the second end of the cover in the longitudinal direction of the cover. The cover may be configured to open and close as the display unit is advanced and withdrawn. The first support arm and the second support arm may support the lower edge reinforcing portion located at the lower edge of the display unit. That is, the display unit may be supported from its back side by the cover. This configuration improves vibration resistance performance in the thickness direction of the display unit.

In the vehicle display device according to the first aspect of the present disclosure, the first support arm may always be biased in a direction in which the first support arm is retracted and the second support arm may always be biased in a direction in which the second support arm is retracted.

According to the vehicle display device of the first aspect of the present disclosure, the first support arm may always be biased in the direction in which the first support arm is retracted and the second support arm may always be biased in a direction in which the second support arm is retracted. Therefore, even when the first support arm and the second support arm are extended as the display unit protrudes beyond the ceiling, the first support arm and the second support arm may be also automatically stored when the display unit is stored above the ceiling.

In the vehicle display device according to the first aspect of the present disclosure, the lower edge reinforcing portion may be provided with a pair of caught portions including a first caught portion and a second caught portion. The first caught portion may be located on a first end of the lower edge reinforcing portion in a longitudinal direction of the lower edge reinforcing portion and the second caught portion may be located on a second end of the lower edge reinforcing portion in the longitudinal direction of the lower edge reinforcing portion. A first catching portion that is configured to catch the first caught portion may be provided on a distal end of the first support arm, and a second catching portion that is configured to catch the second caught portion may be provided on a distal end of the second support arm.

According to the vehicle display device of the first aspect of the present disclosure, the first caught portion may be located on the first end of the lower edge reinforcing portion in the longitudinal direction of the lower edge reinforcing portion and the second caught portion may be located on the second end of the lower edge reinforcing portion in the longitudinal direction of the lower edge reinforcing portion. A first catching portion that is configured to catch the first caught portion may be provided on a distal end of the first support arm and a second catching portion that is configured to catch the second caught portion may be provided on a distal end of the second support arm. Therefore, the first support arm and the second support arm may be accurately extended and retracted as the display unit is advanced and withdrawn, and the display unit may be effectively supported by the cover including the first support arm and the second support arm.

In the vehicle display device according to the first aspect of the present disclosure, the lower edge reinforcing portion may be provided with a pair of engaging rollers including a first engaging roller and a second engaging roller. The first engaging roller may be located on a first end of the lower edge reinforcing portion in a longitudinal direction of the lower edge reinforcing portion and the second engaging roller may be located on a second end of the lower edge reinforcing portion in the longitudinal direction of the lower edge reinforcing portion. An axial direction of the first engaging roller and an axial direction of the second engaging roller may be in line with the longitudinal direction of the lower edge reinforcing portion. A first catching protrusion that is configured to catch the first engaging roller may be provided on a distal end of the first support arm, and a second catching protrusion that is configured to catch the second engaging roller may be provided on a distal end of the second support arm.

According to the vehicle display device of the first aspect of the present disclosure, the first engaging roller may be located on the first end of the lower edge reinforcing portion and the second engaging roller may be located on the second end of the lower edge reinforcing portion. The axial direction of the first engaging roller and the axial direction of the second engaging roller may be in line with the longitudinal direction of the lower edge reinforcing portion. The first catching protrusion that is configured to catch the first engaging roller may be provided on the distal end of the first support arm, and a second catching protrusion that is configured to catch the second engaging roller may be provided on the distal end of the second support arm. Therefore, the first support arm and the second support arm may be accurately extended and retracted as the display unit is advanced and withdrawn, and the display unit may be effectively supported by the cover including the first support arm and the second support arm.

In the vehicle display device according to the first aspect of the present disclosure, the support mechanism may include a side edge support portion that supports a side edge portion of the display unit.

According to the vehicle display device of the first aspect of the present disclosure, the support mechanism may include the side edge support portion that supports the side edge portion of the display unit. Therefore, the display unit may have sufficient rigidity in a twisting direction of the display unit, as compared to the case where the support mechanism does not include the side edge support portion that supports the side edge portion of the display unit.

In the vehicle display device according to the first aspect of the present disclosure, the display unit may be stored above the ceiling so as to be substantially parallel to the ceiling.

According to the vehicle display device of the first aspect of the present disclosure, the display unit may be stored above the ceiling so as to be substantially parallel to the ceiling. Therefore, unlike the case where the display unit is not substantially parallel to the ceiling when stored above the ceiling, the display unit may be stored without having to increase the vertical length of a space above the ceiling portion.

As described above, according to the present disclosure, the display unit of the vehicle display device has sufficient rigidity even when the display unit is in the form of a flexible film.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is an enlarged schematic front view showing the display of the vehicle display device according to the embodiment advanced so that approximately half the display surface protrudes beyond the ceiling;

FIG. 8 is an enlarged schematic side view showing the display of the vehicle display device according to the embodiment advanced so that the entire display surface protrudes beyond the ceiling;

FIG. 9 is an enlarged schematic front view showing the display of the vehicle display device according to the embodiment advanced so that the entire display surface protrudes beyond the ceiling; and FIG. 10 is an enlarged schematic front view showing the state of a cover when the display of the vehicle display device according to the embodiment is advanced so that the entire display surface protrudes beyond the ceiling.

DETAILED DESCRIPTION OF EMBODIMENTS

Figure 1:
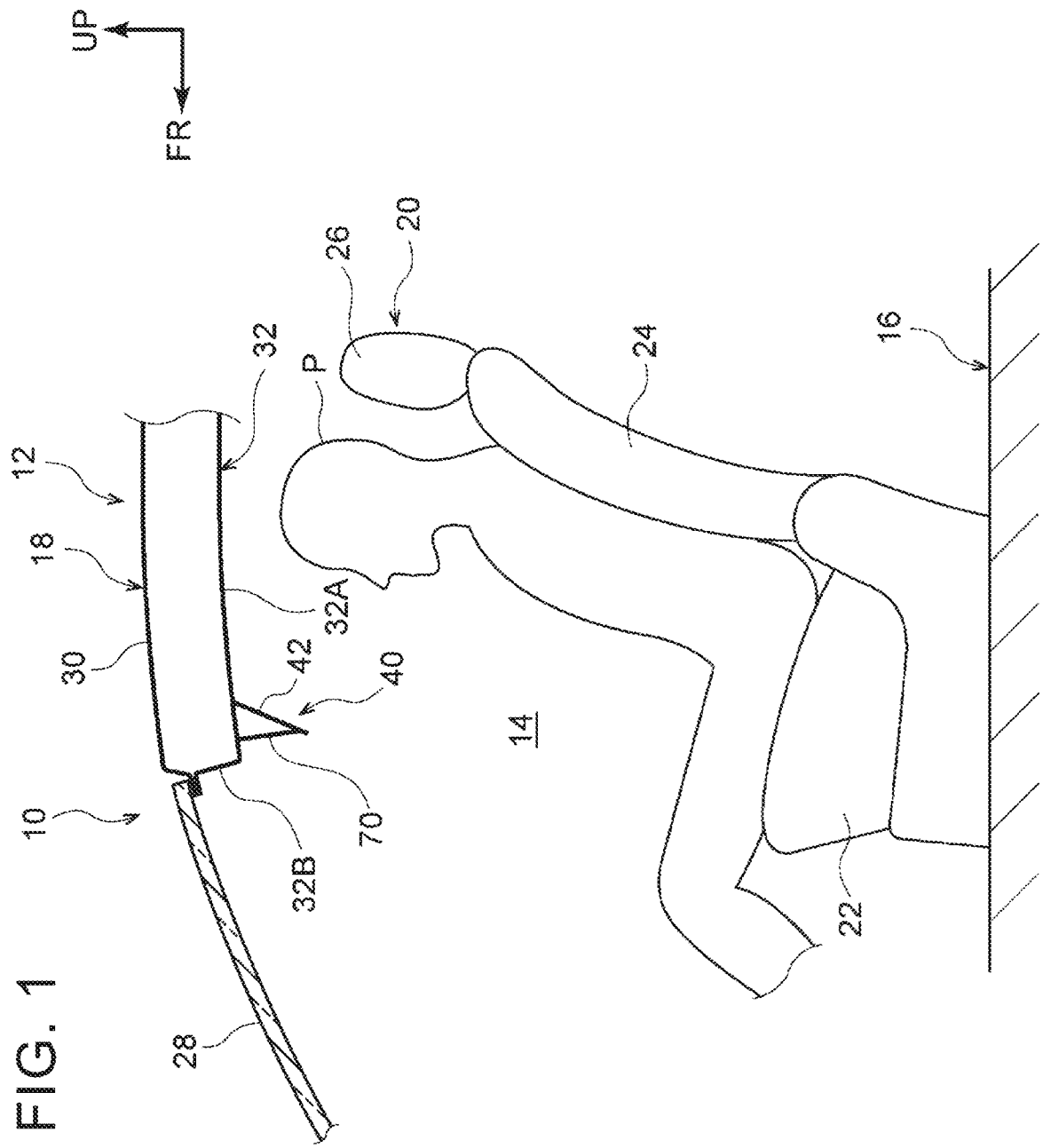
FIG. 1 is a schematic side view of a vehicle cabin of a vehicle equipped with a vehicle display device according to an embodiment.

Hereinafter, an embodiment according to the present disclosure will be described in detail with reference to the drawings. For convenience of description, arrows UP, FR, and LH shown as appropriate in the drawings indicate the upward direction of a vehicle body, the forward direction of the vehicle body, and the leftward direction of the vehicle body, respectively. When terms indicating directions such as upper and lower, front and rear, and right and left are used in the following description, these terms mean upper and lower in the up-down (vertical) direction of the vehicle body, front and rear in the front-rear (longitudinal) direction of the vehicle body, and right and left in the right-left (lateral) direction of the vehicle body unless otherwise specified.

As shown in FIG. 1, a vehicle 10 equipped with a vehicle display device 40 according to the present embodiment includes a vehicle body 12 that forms a main part of a vehicle cabin 14. A floor portion 16 is located on the lower side of the vehicle body 12, and a roof portion 18 is located on the upper side of the vehicle body 12. A seat 20 for an occupant P to sit in is located on the floor portion 16.

The seat 20 includes a seat cushion 22 that supports the buttocks and thighs of the occupant P, a seatback 24 that supports the back of the occupant P, and a headrest 26 that supports the head of the occupant P. The seatback 24 is rotatably supported at its lower end by the rear end of the seat cushion 22. The seatback 24 is configured so that its tilt angle can be adjusted.

A front windshield glass 28 is located in front of the seat 20, that is, on the front side of the vehicle cabin 14. The front windshield glass 28 is made of a transparent glass plate, and extends downward toward the front from the front peripheral edge of the roof portion 18 as viewed from the side in the lateral direction of the vehicle 10.

The roof portion 18 includes a roof panel 30 that forms a part of a design surface of the vehicle body 12. The roof panel 30 is covered from below by a roof trim 32 that is an interior member. The roof trim 32 forms the ceiling of the vehicle cabin 14, and mainly includes a ceiling portion 32A and a front wall portion 32B. The ceiling portion 32A serves as the ceiling of the vehicle cabin 14. The front wall portion 32B extends upward from the front peripheral edge of the ceiling portion 32A.

Figure 2:
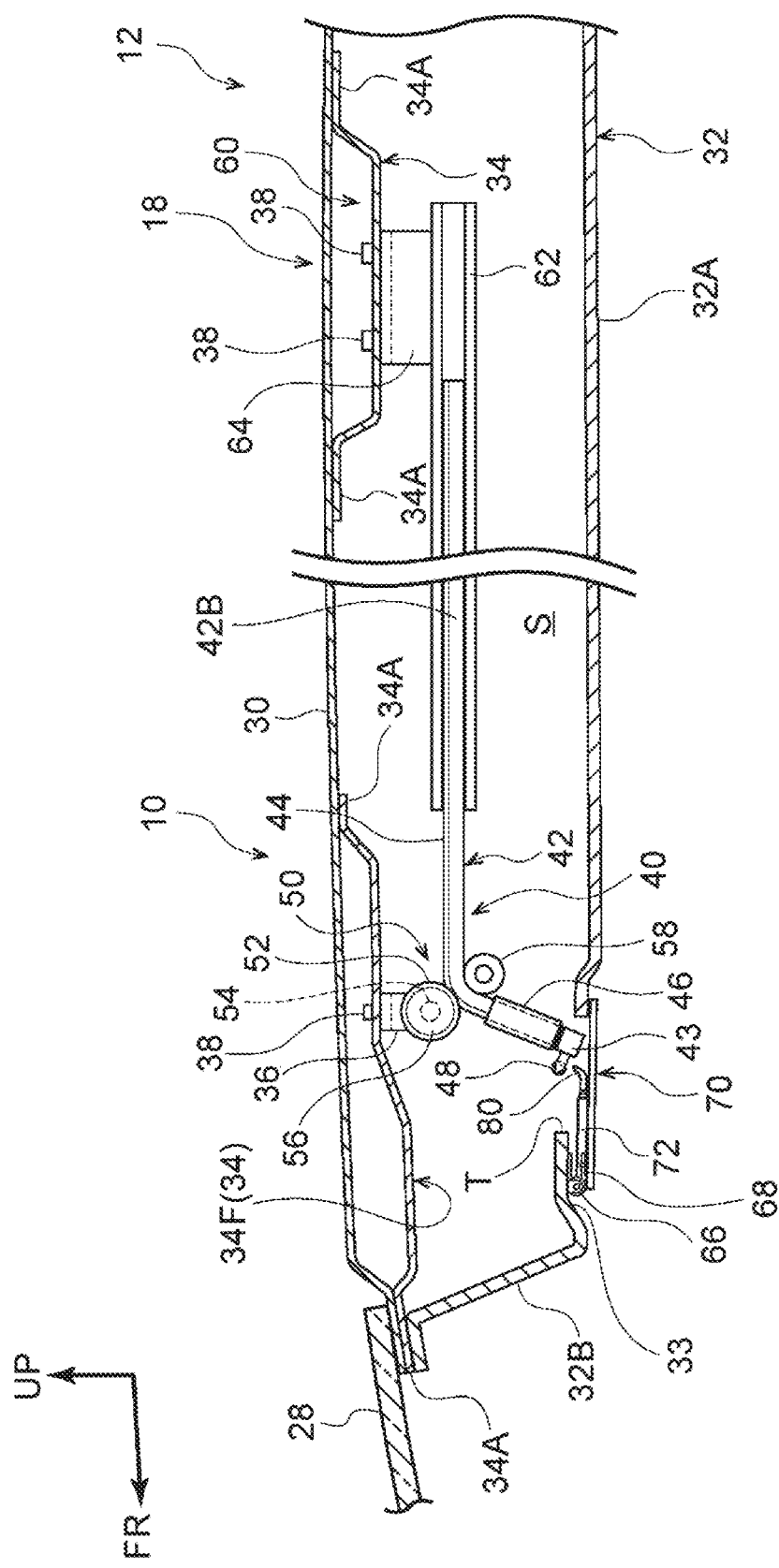
FIG. 2 is an enlarged schematic side view of a display of the vehicle display device according to the embodiment stored above a ceiling.

As shown in FIG. 2, the roof panel 30 is reinforced with multiple roof reinforcements 34 arranged spaced apart from each other in the longitudinal direction. Each roof reinforcement 34 has a substantially hat-shaped cross section, and extends in the lateral direction of the vehicle 10. Front and rear flange portions 34A of each roof reinforcement 34 are joined to the roof panel 30, so that each roof reinforcement 34 together with the roof panel 30 forms a closed cross-sectional shape.

The roof reinforcement 34F located closest to the front of the vehicle 10 is placed along the front peripheral edge of the roof panel 30. Specifically, the front flange portion 34A of the roof reinforcement 34F is placed on the front end of the roof panel 30 from below, and the upper end of the front wall portion 32B is placed on and joined to the flange portion 34A from below. The upper end of the front windshield glass 28 is placed on and joined to the front end of the roof panel 30 from above.

A display 42 can be stored above the ceiling portion 32A of the roof trim 32, that is, in the space S between the roof panel 30 and the ceiling portion 32A of the roof trim 32. The display 42 is a display unit of the vehicle display device 40. The display 42 is in the form of a rectangular film including an organic electroluminescence device. The display 42 includes a display surface 42A (see FIGS. 7 and 9) on its one surface (lower surface), and the display surface 42A can display information to the occupant P (see FIG. 1). A substrate of the display 42 in the form of a rectangular film is made of, for example, a flexible resin. However, the material is not limited to resins.

The display 42 is electrically connected via a wire, not shown, to a control device (not shown) that performs various controls of the vehicle display device 40. The display 42 can display various images etc. on the display surface 42A as driven by signals output from the control device. The display 42 is supported by the roof portion 18 (roof panel 30) via a display support portion 60. The display 42 is configured to be advanced from the ceiling portion 32A to protrude into the vehicle cabin 14 and withdrawn from the vehicle cabin 14 to be stored above the ceiling portion 32A by a display drive unit 50.

Specifically, the display drive unit 50 includes: a pair of pinions 52 supported by the roof reinforcement 34F via a pair of mounts 36; a pair of racks 44, described below, meshing with the pinions 52 from below; a motor 56 mounted coaxially with one pinion 52; and a pair of roller guides 58 supporting the pair of racks 44 from below.

The racks 44 are made of a flexible material, and are located on both ends of the display 42 in the lateral direction of the vehicle 10, that is, on the other surfaces (back surfaces) of ends 42B of the display 42 located outside the display surface 42A in the lateral direction of the vehicle 10 (hereinafter referred to as "side edge portions 42B"), so as to extend in the direction in which the display 42 is advanced and withdrawn. Ends of the side edge portions 42B located outside the racks 44 in the lateral direction of the vehicle 10 are supported by side edge support portions 46 that are a support mechanism configured to be telescopically extended and retracted as the display 42 is advanced from and withdrawn into the ceiling portion 32A.

Figure 3:
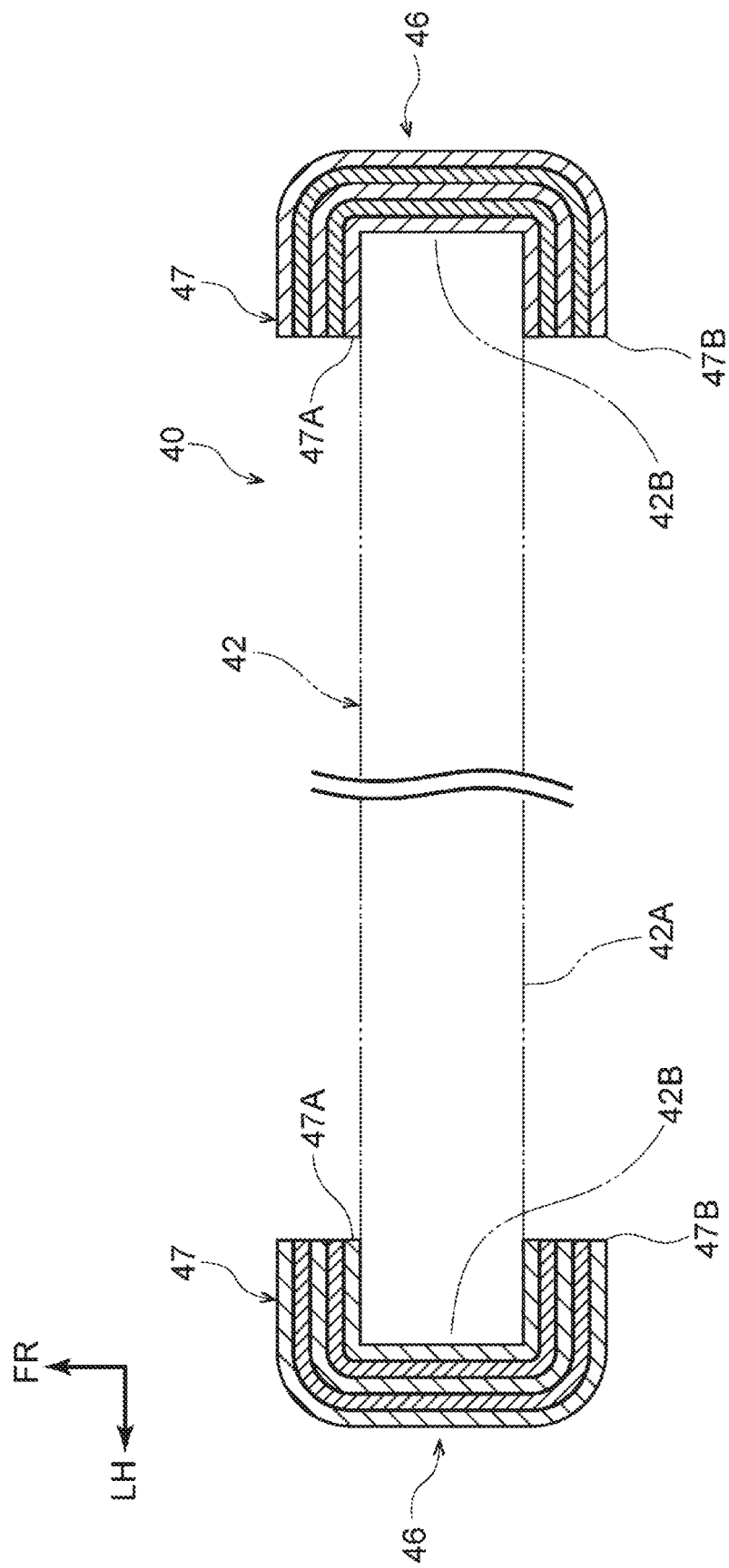
FIG. 3 is an enlarged schematic plan view showing a configuration of side edge support portions in the display of the vehicle display device according to the embodiment.

As shown in FIG. 2, when the display 42 is stored, the side edge support portions 46 are located below the roller guides 58 (downstream in the direction in which the display 42 is advanced to protrude beyond the ceiling portion 32A). The side edge support portions 46 are made of resin. As shown in FIG. 3, each side edge support portion 46 is composed of a plurality of slide members 47 having a substantially U-shaped cross section.

The innermost slide members 47A of the side edge support portions 46 are fixed to the lower ends of the side edge portions 42B of the display 42 (immediately above a lower edge reinforcing portion 43 that will be described later), and the outermost slide members 47B of the side edge support portions 46 are fixed to the mounts 36. The slide members 47 are shaped so that they are stacked on each other (sequentially increased in size) with the slide member 47A being the innermost (smallest) and the slide member 47B the outermost (largest).

Every slide member 47 except the outermost slide member 47B has, on its upper end, a protruding portion (not shown) that is caught by the lower end of the slide member 47 stacked on that slide member 47. Each slide member 47 has, on its inner end in the lateral direction of the vehicle 10, a rail portion (not shown) protruding inward in the thickness direction of the display 42. The rail portion of each slide member 47 is retained by the inner end of the slide member 47 (slide member 47 stacked on this slide member 47) in the lateral direction of the vehicle 10, and is configured to slide along this inner end of the slide member 47.

The slide members 47 of each side edge support portion 46 are thus configured to telescopically slide with respect to each other while covering the side edge portion 42B of the display 42 (see FIGS. 7 and 9). When the display 42 is stored, the side edge support portions 46 are in the most retracted state with the slide members 47 stacked each other.

As shown in FIG. 2, the pinions 52 are fixed to a rotating shaft 54 extending in the lateral direction of the vehicle 10, and mesh with the racks 44. An output shaft (not shown) of the motor 56 is coaxially and integrally connected to one end of the rotating shaft 54 located outside one pinion 52 in the lateral direction of the vehicle 10. The pinions 52 can be synchronously rotated in both forward and reverse directions as the motor 56 is driven based on a control signal from the control device. The display 42 is thus configured to be advanced from and withdrawn into the ceiling portion 32A.

The one end of the rotating shaft 54 located on the one pinion 52 side is supported by the mount 36 located on one side via a bearing (not shown), and the other end of the rotating shaft 54 located on the other pinion 52 side is supported by the mount 36 located on the other side via a bearing (not shown). The mounts 36 are fixed by fastening members, not shown, to weld nuts 38 placed on the roof reinforcement 34F.

The motor 56 is supported by the mount 36 located on the one side. Although not shown in detail, the roller guides 58 are also rotatably supported by the mounts 36. The roller guides 58 support the lower sides of the racks 44 located on the side edge portions 42B of the display 42 from below. The display 42 is advanced (downward toward the front) into the vehicle cabin 14 as guided by rotation of the pinions 52 and rotation of the roller guides 58.

The display support portion 60 is configured to support the upstream side of the display 42 in the direction in which the display 42 is advanced to protrude into the vehicle cabin 14, and includes a pair of guide rails 62 and a pair of rail mounts 64. The guide rails 62 are located behind the roller guides 58, and extend in the longitudinal direction (direction in which the display 42 is advanced and withdrawn) along the side edge portions 42B of the display 42. The guide rails 62 have a substantially U-shape that opens inward in the lateral direction of the vehicle 10 as viewed from the front in the longitudinal direction.

The side edge portions 42B of the display 42 including the racks 44 can be inserted into the guide rails 62, and the guide rails 62 can guide the display 42 in the direction in which the display 42 is advanced and withdrawn (longitudinal direction). The guide rails 62 are attached via the rail mounts 64 to the roof reinforcement 34 located behind the roof reinforcement 34F. That is, the rail mounts 64 are fixed by fastening members, not shown, to weld nuts 38 placed on the roof reinforcement 34.

As shown in FIG. 2, the roof trim 32 has a recessed portion 33 that is bent upward and recessed. The recessed portion 33 is located at a predetermined position in the lateral direction of the vehicle 10 in the boundary portion between the ceiling portion 32A and the front wall portion 32B of the roof trim 32. The roof trim 32 further has a slit portion T extending in the lateral direction of the vehicle 10. The slit portion T is located behind the recessed portion 33, and the display 42 can be advanced from above the ceiling portion 32A through the slit portion T to protrude into the vehicle cabin 14.

A front end of a cover 70 in the shape of a flat plate is located on the lower surface of the recessed portion 33. The cover 70 is long in the lateral direction of the vehicle 10, and is rotatable about its front end so that the cover 70 can close the slit portion T from below. As is also shown in FIG. 10, pairs of brackets 66 are integrally provided on both ends of the lower surface of the recessed portion 33 in the lateral direction of the vehicle 10, one pair on each end, so as to protrude from the ends of the lower surface of the recessed portion 33. Each bracket 66 has a through hole (not shown) extending in the lateral direction of the vehicle 10.

Cylindrical portions 71 are integrally provided on the front end of the cover 70. Each cylindrical portion 71 is located between the corresponding brackets 66. The inner diameter of the cylindrical portions 71 is larger than the inner diameter of the through holes of the brackets 66. Accordingly, each cylindrical portion 71 is placed between the brackets 66, and solid cylindrical pins 67 etc. having such an outer diameter that the pins 67 can be press-fitted into the through holes of the brackets 66 are inserted through the through holes of the brackets 66 and the through holes of the cylindrical portions 71. The cover 70 is thus rotatable with respect to the recessed portion 33.

Torsion springs 68 are fitted on the outer peripheral surfaces of the cylindrical portions 71. When the display 42 is not in use (when the display 42 is stored), the cover 70 is held closed by the biasing force of the torsion springs 68 such that the thickness direction of the cover 70 coincides with the vertical direction. The cover 70 is thus configured to open and close as the display 42 is advanced and withdrawn.

That is, the cover 70 is configured so that, when the display 42 trying to protrude downward toward the front into the vehicle cabin 14 through the slit portion T pushes the cover 70 from above, the rear end side of the cover 70 is rotated downward about the pins 67 against the biasing force of the torsion springs 68 and the cover 70 is opened.

Figure 4:
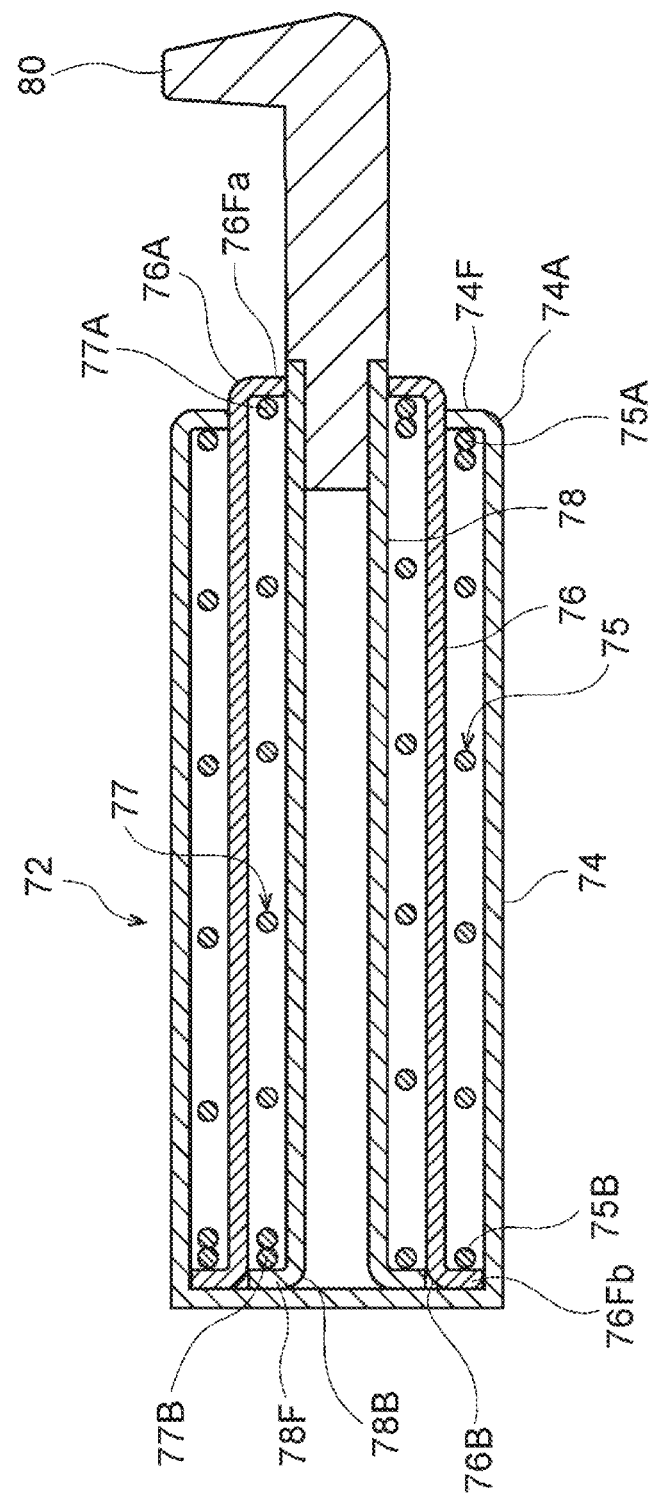
FIG. 4 is an enlarged schematic side view showing a retracted state of a support arm of the vehicle display device according to the embodiment.
Figure 5:
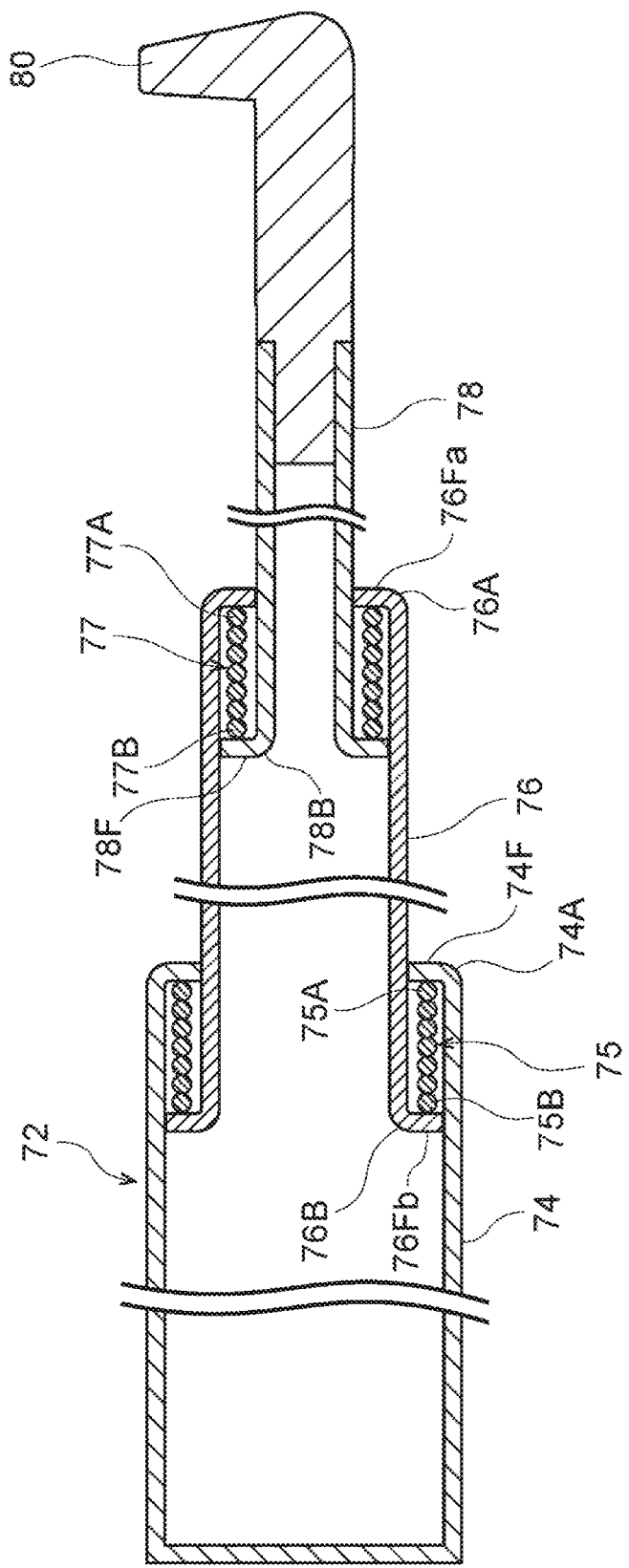
FIG. 5 is an enlarged schematic side view showing an extended state of the support arm of the vehicle display device according to the embodiment.

As shown in FIG. 2, a pair of support arms 72 that is a support mechanism is provided. One of the support arms 72 is located on one end of the back surface (upper surface when the cover 70 is closed) of the cover 70 in the lateral direction of the vehicle 10 and the other one of the support arms 72 is located on the other end of the back surface (upper surface when the cover 70 is closed) of the cover 70 in the lateral direction of the vehicle 10. As shown in FIGS. 4, 5 and 10, each support arm 72 is made of metal, and includes a cylindrical small diameter rod 78, a cylindrical large diameter rod 74, and a cylindrical medium diameter rod 76. The diameter of the medium diameter rod 76 is larger than the diameter of the small diameter rod 78 and smaller than the diameter of the large diameter rod 74.

As shown in FIGS. 4 and 5, each support arm 72 is provided with a compression coil spring (hereinafter simply referred to as "coil spring") 75 between the large diameter rod 74 and the medium diameter rod 76. The coil spring 75 is a biasing member that always biases the medium diameter rod 76 into the large diameter rod 74 (always biases the medium diameter rod 76 in the direction in which the overall length of the support arm 72 is reduced).

That is, the large diameter rod 74 has, at its one end 74A, a flange portion 74F protruding inward in the radial direction, and the medium diameter rod 76 has, at the other end 76B, a flange portion 76Fb protruding outward in the radial direction. One end 75A of the coil spring 75 is in contact with the flange portion 74F of the large diameter rod 74, and the other end 75B of the coil spring 75 is in contact with the flange portion 76Fb of the medium diameter rod 76. The flange portion 74F and the flange portion 76Fb are thus always biased in the direction in which the flange portion 74F and the flange portion 76Fb are separated from each other.

Similarly, each support arm 72 is provided with a compression coil spring (hereinafter simply referred to as "coil spring") 77 between the medium diameter rod 76 and the small diameter rod 78. The coil spring 77 is a biasing member that always biases the small diameter rod 78 into the medium diameter rod 76 (always biases the small diameter rod 78 in the direction in which the overall length of the support arm 72 is reduced).

That is, the medium diameter rod 76 has, at its one end 76A, a flange portion 76Fa protruding inward in the radial direction, and the small diameter rod 78 has, at the other end 78B, a flange portion 78F protruding outward in the radial direction. One end 77A of the coil spring 77 is in contact with the flange portion 76Fa of the medium diameter rod 76, and the other end 77B of the coil spring 77 is in contact with the flange portion 78F of the small diameter rod 78. The flange portion 76Fa and the flange portion 78F are thus always biased in the direction in which the flange portion 76Fa and the flange portion 78F are separated from each other.

The small diameter rod 78 of each support arm 72 has a catching protrusion 80 integrally formed at its distal end (one end). The catching protrusion 80 is a catching portion that is configured to catch an engaging roller 48 described below. As shown in FIGS. 4 and 5, the catching protrusion 80 has a substantially solid cylindrical shape, and is bent in a substantially L shape as viewed in section taken in the axial direction of the catching protrusion 80. The catching protrusion 80 is configured so that the engaging roller 48 engages with the catching protrusion 80 from above (the engaging roller 48 is caught by the catching protrusion 80) when the display 42 is advanced to protrude beyond the ceiling portion 32A (see FIG. 8).

As shown in FIGS. 2, 8, and 10, a lower edge reinforcing portion 43 is located along the entire length of the lower edge of the display 42. The lower edge reinforcing portion 43 is made of resin and reinforces the lower edge of the display 42. The lower edge reinforcing portion 43 has higher rigidity than the display 42. Due to the weight of the lower edge reinforcing portion 43, the part of the display 42 located forward of the roller guides 58 when the display 42 is stored hangs downward toward the front (see FIG. 2). One of the engaging rollers 48, the engaging rollers 48 being a pair of caught portions, is rotatably provided on one end in the longitudinal direction (lateral direction of the vehicle 10) of the back surface of the lower edge reinforcing portion 43 and the other one of the engaging rollers 48 is rotatably provided on the other end in the longitudinal direction (lateral direction of the vehicle 10) of the back surface of the lower edge reinforcing portion 43. The back surface of the lower edge reinforcing portion 43 is the opposite surface of the lower edge reinforcing portion 43 from the display surface 42A.

Specifically, as shown in FIGS. 8 and 10, pairs of brackets 41 are integrally provided on both ends in the longitudinal direction of the back surface of the lower edge reinforcing portion 43 (immediately below the slide members 47A), one pair on each end, so as to protrude from the ends of the back surface of the lower edge reinforcing portion 43. Each bracket 41 has a through hole (not shown). Each engaging roller 48 also has a through hole (not shown) in its axial center. The inner diameter of the through holes of the engaging rollers 48 is larger than the inner diameter of the through holes of the brackets 41.

Accordingly, each engaging roller 48 is placed between the brackets 41, and solid cylindrical pins 82 etc. having such an outer diameter that the pins 82 can be press-fitted into the through holes of the brackets 41 are inserted through the through holes of the brackets 41 and the through holes of the engaging rollers 48. The engaging rollers 48 are thus rotatable. The middle portion in the axial direction of each engaging roller 48 is recessed along its entire circumference so as to have a substantially arc shape in section. The catching protrusions 80 engage with the arc-shaped recessed portions 48A of the engaging rollers 48 (see FIGS. 8 and 10).

Next, the functions of the vehicle display device 40 of the present embodiment having the above configuration will be described.

As shown in FIG. 2, when the display 42 is not in use, the display 42 is kept stored above the ceiling portion 32A of the roof trim 32. At this time, most parts of the side edge portions 42B of the display 42 are held by the guide rails 62. The lower edge of the display 42 is reinforced by the lower edge reinforcing portion 43, and the part of the display 42 located forward of the roller guides 58 hangs downward toward the front due to the weight of the lower edge reinforcing portion 43.

The side edge support portions 46 are disposed on the handing down part of the display 42 with the slide members 47 stacked each other so that the side edge support portions 46 have the shortest length (in the most retracted state). The slit portion T is closed by the cover 70. In this state, the engaging rollers 48 are located above the catching protrusions 80 so as not to engage with (contact) the catching protrusions 80.

Figure 6:
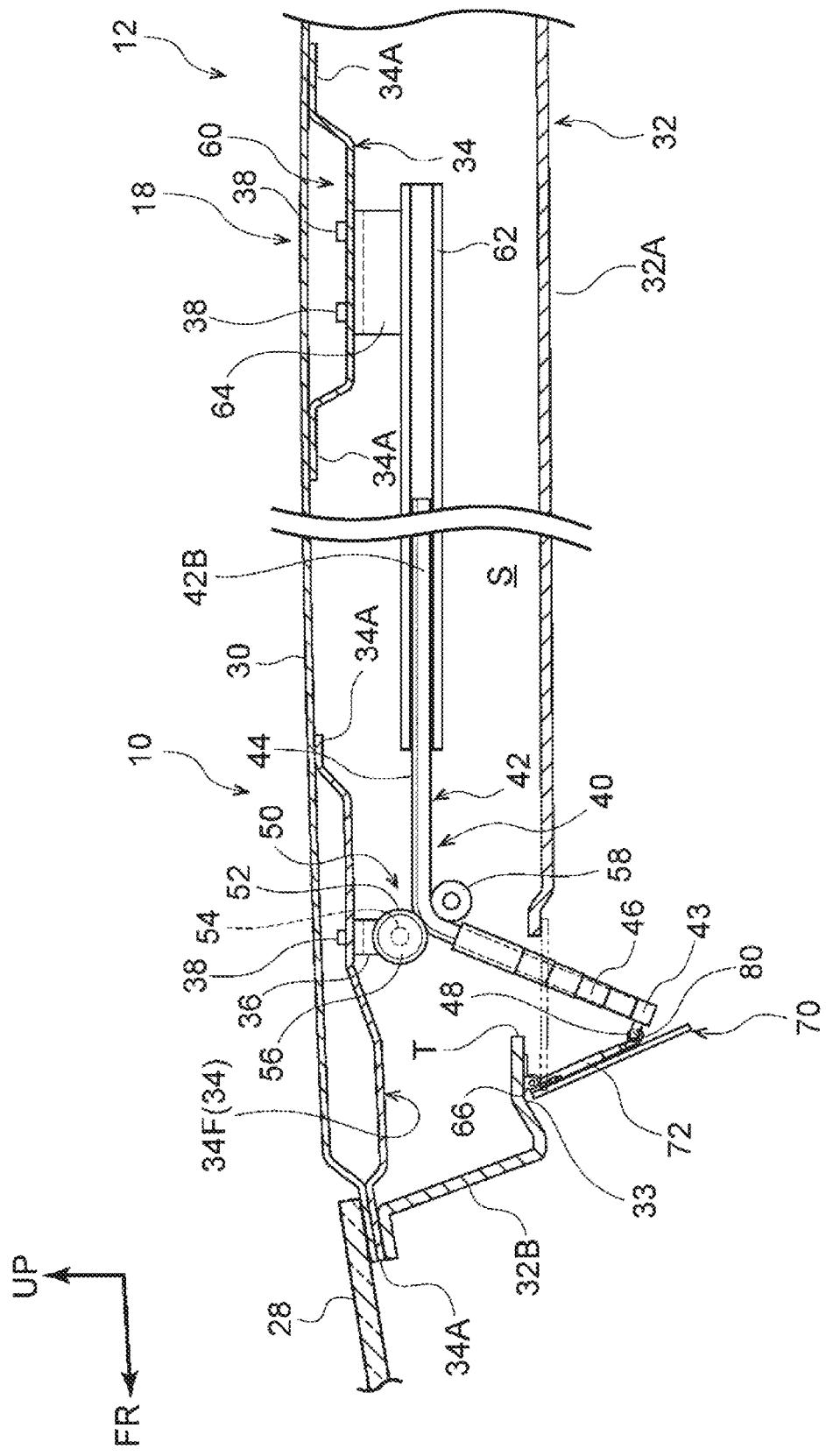
FIG. 6 is an enlarged schematic side view showing the display of the vehicle display device according to the embodiment advanced so that approximately half a display surface protrudes beyond the ceiling.

As shown in FIGS. 6 and 7, when a part of the display surface 42A of the display 42 (e.g., approximately the downstream half of the display surface 42A in the direction in which the display 42 is advanced to protrude into the vehicle cabin 14) is used, the control device controls the pinions 52 to rotate by a predetermined amount in the clockwise direction in FIG. 6, and thus advances the display 42 downward toward the front. At this time, as the display 42 is moved downward toward the front, the engaging rollers 48 engage with the catching protrusions 80 of the support arms 72 from above. That is, the catching protrusions 80 relatively engage with (catch) the engaging rollers 48.

As the display 42 is further advanced downward toward the front in this state, the rear end side of the cover 70 is rotated downward about the pins 67 against the biasing force of the torsion springs 68. The slit portion T is thus opened, and the display 42 protrudes into the vehicle cabin 14. That is, the display 42 protrudes into the vehicle cabin 14 with the upstream sides of the side edge portions 42B in the direction in which the display 42 is advanced to protrude into the vehicle cabin 14 being held by the guide rails 62 and with the back sides (forward facing sides) of the display 42 being supported by the cover 70 via the support arms 72.

At this time, the innermost slide members 47A of the side edge support portions 46 are pulled as the display 42 is moved downward toward the front. Therefore, the slide members 47 of each side edge support portion 46 telescopically slide relative to each other in the direction in which the side edge support portion 46 is extended. As a result, the downstream sides of the side edge portions 42B of the display 42 in the direction in which the display 42 is advanced to protrude into the vehicle cabin 14 are also supported by the side edge support portions 46 (slide members 47).

Therefore, even when the display 42 is in the form of a flexible film, the display 42 has sufficient rigidity. In other words, even the display 42 in the form of a flexible film can reduce the phenomenon that it is difficult for the occupant P to see the image displayed on the display 42 due to vibration of the vehicle 10 that occurs while the vehicle 10 is traveling. Visibility of the display 42 can thus be improved.

As shown in FIGS. 8, 9, and 10, when the entire display surface 42A of the display 42 is used, the control device controls the pinions 52 to rotate further by a predetermined amount in the clockwise direction in FIG. 8, and thus advances the display 42 further downward toward the front. As the display 42 moves downward toward the front, the engaging rollers 48 push the catching protrusions 80 of the support arms 72 downward toward the front while still engaging with the catching protrusions 80 from above.

When the catching protrusions 80 are pushed downward toward the front, the support arms 72 are extended against the biasing forces of the coil springs 75, 77. In other words, the cover 70 continues to support the display 42 from the back side of the display 42 via the support arms 72.

At this time, the innermost slide members 47A of the side edge support portions 46 are further pulled as the display 42 is moved downward toward the front. Therefore, the slide members 47 of each side edge support portion 46 telescopically slide relative to each other in the direction in which the side edge support portion 46 is extended. In other words, the side edge support portions 46 becomes the most extended state with the longest length. Accordingly, the side edge portions 42B of the display 42 are also kept supported by the side edge support portions 46 (slide members 47).

As described above, even when the entire display surface 42A of the display 42 in the form of a flexible film protrudes into the vehicle cabin 14, the display 42 has sufficient rigidity. Moreover, as described above, the display 42 is supported from its back side by the cover 70 via the support arms 72. This configuration can improve vibration resistance performance in the thickness direction of the display 42 during, for example, traveling of the vehicle 10.

The engaging rollers 48 of the lower edge reinforcing portion 43 are configured to engage with the catching protrusions 80 of the support arms 72 (the catching protrusions 80 are configured to catch the engaging rollers 48). Therefore, the support arms 72 can be accurately telescopically extended and retracted as the display 42 is advanced and withdrawn. Accordingly, the display 42 can be effectively supported by the cover 70.

When the display 42 is advanced from and withdrawn into the ceiling portion 32A, the side edge portions 42B of the display 42 are supported by the side edge support portions 46 (slide members 47 that telescopically slide relative to each other). Therefore, the display 42 also has sufficient rigidity in a twisting direction of the display 42, as compared to the case where the side edge support portions 46 are not provided on the side edge portions 42B of the display 42.

As shown in FIG. 8, even when the entire display surface 42A of the display 42 is advanced to protrude into the vehicle cabin 14, a part of each side edge portion 42B of the display 42 is still held by the guide rail 62. Therefore, unlike, for example, a configuration in which the side edge portions 42B of the display 42 are disengaged from the guide rails 62 when the entire display surface 42A of the display 42 is advanced to protrude into the vehicle cabin 14, it is not necessary to fit the side edge portions 42B of the display 42 back into the guide rails 62 when storing the display 42. Accordingly, the display 42 can be smoothly stored.

That is, when storing the display 42, the control device controls the pinions 52 to rotate in the counterclockwise direction in FIGS. 6 and 8 (opposite direction to the direction described above). As a result, the display 42 protruding into the vehicle cabin 14 is moved upward toward the rear. Since the support arms 72 are always biased by the coil springs 75, 77 in the direction in which the support arms 72 are retracted, the support arms 72 are automatically retracted as the display 42 is moved upward toward the rear.

In other words, the support arms 72 are also automatically stored with the operation of storing the display 42. Therefore, even when storing the display 42, the cover 70 can keep supporting the display 42 from its back side via the support arms 72.

With the operation of storing the display 42, the slide members 47 of each side edge support portion 46 also telescopically slide relative to each other in the direction in which the side edge support portion 46 is retracted. When the display 42 is withdrawn to the position where the cover 70 closes the slit portion T by the biasing force of the torsion springs 68 (until the side edge support portions 46 becomes the most retracted state), the engaging rollers 48 are disengaged from the catching protrusions 80 to the state shown in FIG. 2.

This configuration can restrain or prevent the shapes of the cover 70 and the display 42 from being limited as compared to the case where the engaging rollers 48 are configured not to be disengaged from the catching protrusions 80. In other words, a certain degree of flexibility can be ensured in the shapes of the cover 70 and the display 42.

The display 42 is stored above the ceiling portion 32A such that the display 42 excluding the part located forward of the roller guides 58 (part hanging downward toward the front) is substantially parallel to the ceiling portion 32A. Therefore, unlike the case where the display 42 is not substantially parallel to the ceiling portion 32A when stored above the ceiling portion 32A, the display 42 can be stored without having to increase the vertical length of the space S above the ceiling portion 32A.

Although the vehicle display device 40 according to the embodiment is described above with reference to the drawings, the vehicle display device 40 according to the embodiment is not limited to the illustrated example, and its design can be changed as appropriate within the scope of the present disclosure. For example, the support mechanism is not limited to the illustrated support mechanism.

That is, the side edge support portions 46 are not limited to the illustrated configuration. The side edge support portions 46 may be made of, for example, hard rubber. In this case, the side edge support portions 46 can be bent and deformed with the display 42. Therefore, the side edge support portions 46 can be stored behind the roller guides 58. The side edge support portion 46 may be provided only on one of the side edge portions 42B of the display 42.

The support arms 72 are also not limited to the illustrated configuration, and the configuration that always biases the support arms 72 in the direction in which the support arms 72 are retracted is also not limited to the illustrated configuration. The caught portions are not limited to the engaging rollers 48, and the catching portions are not limited to the catching protrusions 80. The caught portions of the lower edge reinforcing portion 43 need only be configured so that the catching portions of the support arms 72 of the cover 70 can catch the caught portions as the display 42 is moved in the direction in which the display 42 protrudes into the vehicle cabin 14.

What is claimed is:

1. A vehicle display device, comprising:
   a display unit in a shape of a rectangular film, the display unit being configured to be advanced from and withdrawn into a ceiling of a vehicle cabin;
   a lower edge reinforcing portion located at a lower edge of the display unit, the lower edge reinforcing portion reinforcing the lower edge of the display unit;
   a support mechanism configured to be extended and retracted according to an amount by which the display unit protrudes beyond the ceiling, and configured to support the display unit;
   a cover configured to be located on the ceiling, the cover being configured to open and close as the display unit is advanced and withdrawn, wherein
   a longitudinal direction of the cover is in a lateral direction of a vehicle;
   the support mechanism includes a pair of support arms that includes a first support arm and a second support arm;
   the first support arm is provided on a first end of the cover in the longitudinal direction of the cover and is configured to support the lower edge reinforcing portion; and
   the second support arm is provided on a second end of the cover in the longitudinal direction of the cover and is configured to support the lower edge reinforcing portion, wherein:
   the lower edge reinforcing portion is provided with a pair of caught portions including a first caught portion and a second caught portion, the first caught portion is located on a first end of the lower edge reinforcing portion in a longitudinal direction of the lower edge reinforcing portion and the second caught portion is located on a second end of the lower edge reinforcing portion in the longitudinal direction of the lower edge reinforcing portion; and a first catching portion that is configured to catch the first caught portion is provided on a distal end of the first support arm, and a second catching portion that is configured to catch the second caught portion is provided on a distal end of the second support arm.

2. The vehicle display device according to claim 1, wherein the first support arm is always biased in a direction in which the first support arm is retracted and the second support arm is always biased in a direction in which the second support arm is retracted.

3. The vehicle display device according to claim 2, wherein each of the first support arm and the second support arm includes a first rod, a second rod that is located inside the first rod and that is configured to slide relative to the first rod, and a spring member that is located between the first rod and the second rod and that biases the first rod and the second rod in a direction in which a total length of the first rod and the second rod is reduced.

4. The vehicle display device according to claim 3, wherein the first rod includes a first flange portion extending in a direction perpendicular to a longitudinal direction of the first rod, the second rod includes a second flange portion extending in a direction perpendicular to a longitudinal direction of the second rod, and the spring member is in contact with the first flange portion and the second flange portion.

5. The vehicle display device according to claim 1, wherein:
   the lower edge reinforcing portion is provided with a pair of engaging rollers including a first engaging roller and a second engaging roller;
   the first engaging roller is located on a first end of the lower edge reinforcing portion in a longitudinal direction of the lower edge reinforcing portion and the second engaging roller is located on a second end of the lower edge reinforcing portion in the longitudinal direction of the lower edge reinforcing portion;
   an axial direction of the first engaging roller and an axial direction of the second engaging roller are in line with the longitudinal direction of the lower edge reinforcing portion; and
   a first catching protrusion that is configured to catch the first engaging roller is provided on a distal end of the first support arm, and a second catching protrusion that is configured to catch the second engaging roller is provided on a distal end of the second support arm.

6. The vehicle display device according to claim 1, wherein the support mechanism includes a side edge support portion that supports a side edge portion of the display unit.

7. The vehicle display device according to claim 6, wherein the side edge support portion includes a U-shaped first slide member covering the side edge portion of the display unit, and a U-shaped second slide member located outside the U-shaped first slide member and configured to slide with respect to the U-shaped first slide member.

8. The vehicle display device according to claim 1, wherein the display unit is stored above the ceiling so as to be substantially parallel to the ceiling.

9. The vehicle display device according to claim 1, further comprising a display drive unit located above the ceiling, wherein:
   the display drive unit includes a pinion, a rack meshing with the pinion, and a motor configured to rotate the pinion; and
   the display unit includes a display surface configured to display information and a back surface that is an opposite surface of the display unit from the display surface, and the rack is located on the back surface of the display unit.

* * * * *